(12) United States Patent
Junge et al.

(10) Patent No.: US 7,237,451 B2
(45) Date of Patent: Jul. 3, 2007

(54) GEAR-CHANGING DEVICE FOR A MOTOR-VEHICLE GEARBOX

(75) Inventors: Dieter Junge, Gruenendeich (DE); Armin Segeler, Gruenendeich (DE)

(73) Assignee: DaimlerChrysler AG, Stuttgart (DE)

( * ) Notice: Subject to any disclaimer, the term of this patent is extended or adjusted under 35 U.S.C. 154(b) by 954 days.

(21) Appl. No.: 10/147,320

(22) Filed: May 17, 2002

(65) Prior Publication Data

US 2002/0194943 A1 Dec. 26, 2002

(30) Foreign Application Priority Data

May 18, 2001 (DE) ................................ 101 24 274

(51) Int. Cl.
B60K 20/00 (2006.01)
(52) U.S. Cl. .................... 74/473.36; 411/508
(58) Field of Classification Search ............... 74/473.3, 74/473.36; 411/508, 509, 510, 913, 348
See application file for complete search history.

(56) References Cited

U.S. PATENT DOCUMENTS

| | | | |
|---|---|---|---|
| 3,908,235 A * | 9/1975 | Telliard et al. ............. | 411/508 |
| 4,762,437 A * | 8/1988 | Mitomi ....................... | 403/11 |
| 4,810,150 A * | 3/1989 | Matsukane et al. ......... | 411/508 |
| 5,035,154 A * | 7/1991 | Jonischus .................... | 476/65 |
| 5,182,964 A * | 2/1993 | Gellner ........................ | 74/523 |
| 5,184,377 A * | 2/1993 | Ragsdale et al. ........... | 24/704.1 |
| 5,211,519 A * | 5/1993 | Saito ........................... | 411/45 |
| 5,309,783 A * | 5/1994 | Doolittle et al. .......... | 74/473.21 |
| 5,384,940 A * | 1/1995 | Soule et al. ................. | 24/453 |
| 5,400,673 A * | 3/1995 | Brock ......................... | 74/473.3 |
| 5,451,187 A * | 9/1995 | Brinkley ..................... | 473/28 |
| 5,529,424 A * | 6/1996 | Neubert et al. ............. | 403/298 |
| 5,562,198 A * | 10/1996 | Koschig ................. | 198/867.08 |
| 5,704,746 A * | 1/1998 | Leib et al. ................... | 411/24 |
| 5,799,538 A * | 9/1998 | DeJonge et al. ........... | 74/473.3 |
| 5,809,839 A * | 9/1998 | Tomida ....................... | 74/473.3 |
| 6,029,537 A * | 2/2000 | Nagao ....................... | 74/473.33 |
| 6,061,240 A * | 5/2000 | Butterbaugh et al. ....... | 361/704 |

FOREIGN PATENT DOCUMENTS

DE 297 09 980 * 5/1997
DE 199 18 509 12/2000

* cited by examiner

*Primary Examiner*—David M. Fenstermacher
(74) *Attorney, Agent, or Firm*—Crowell & Moring LLP

(57) ABSTRACT

A gear-changing device for a motor-vehicle gearbox, including a gear-changing lever which is pivotable arranged with respect to a support part about a bolt. The bolt is held in an axially nondisplaceable manner with respect to the support part. In order to provide a cost-effective and easy-to-install gear-changing device, the bolt is held by a catch.

4 Claims, 2 Drawing Sheets

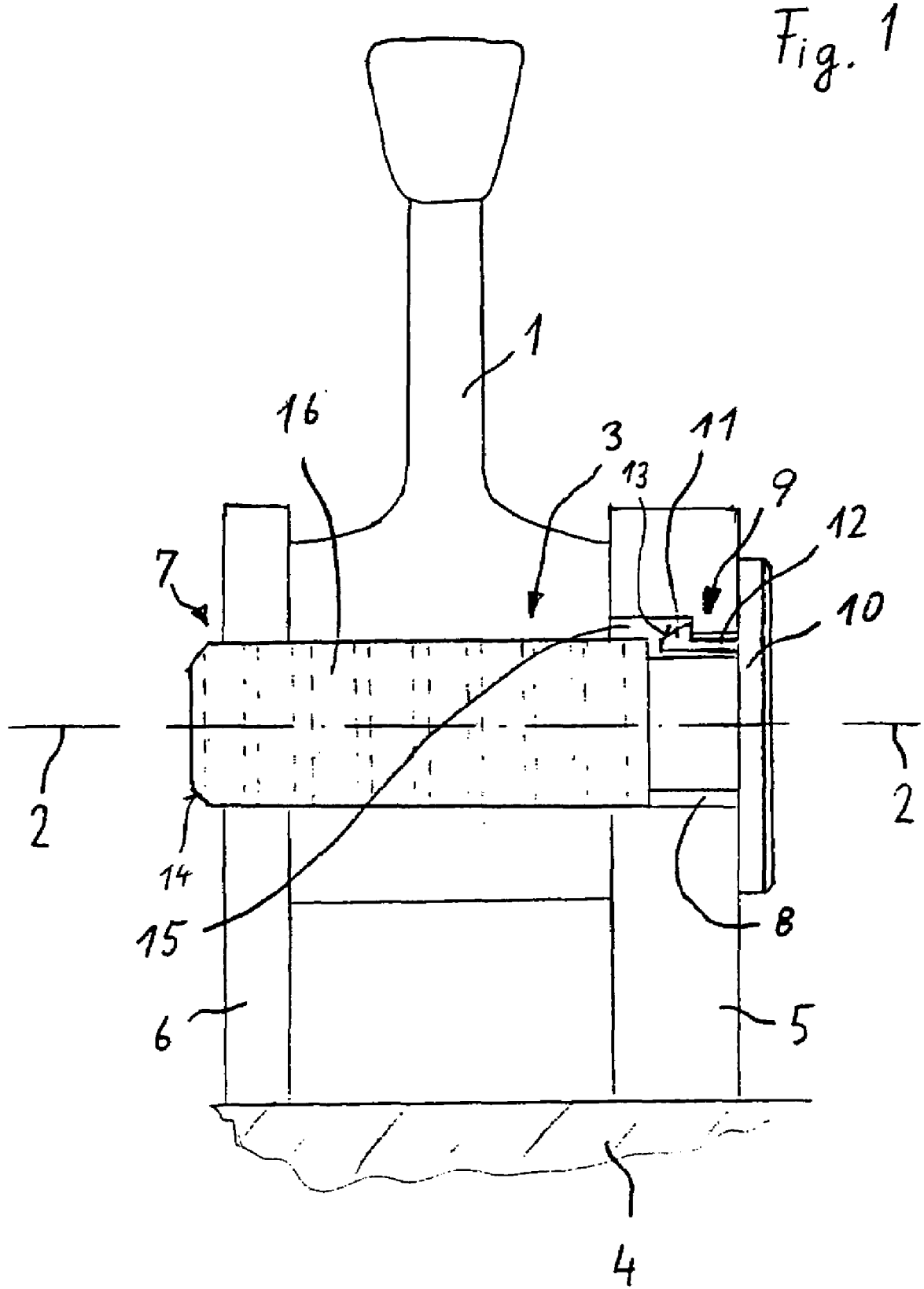

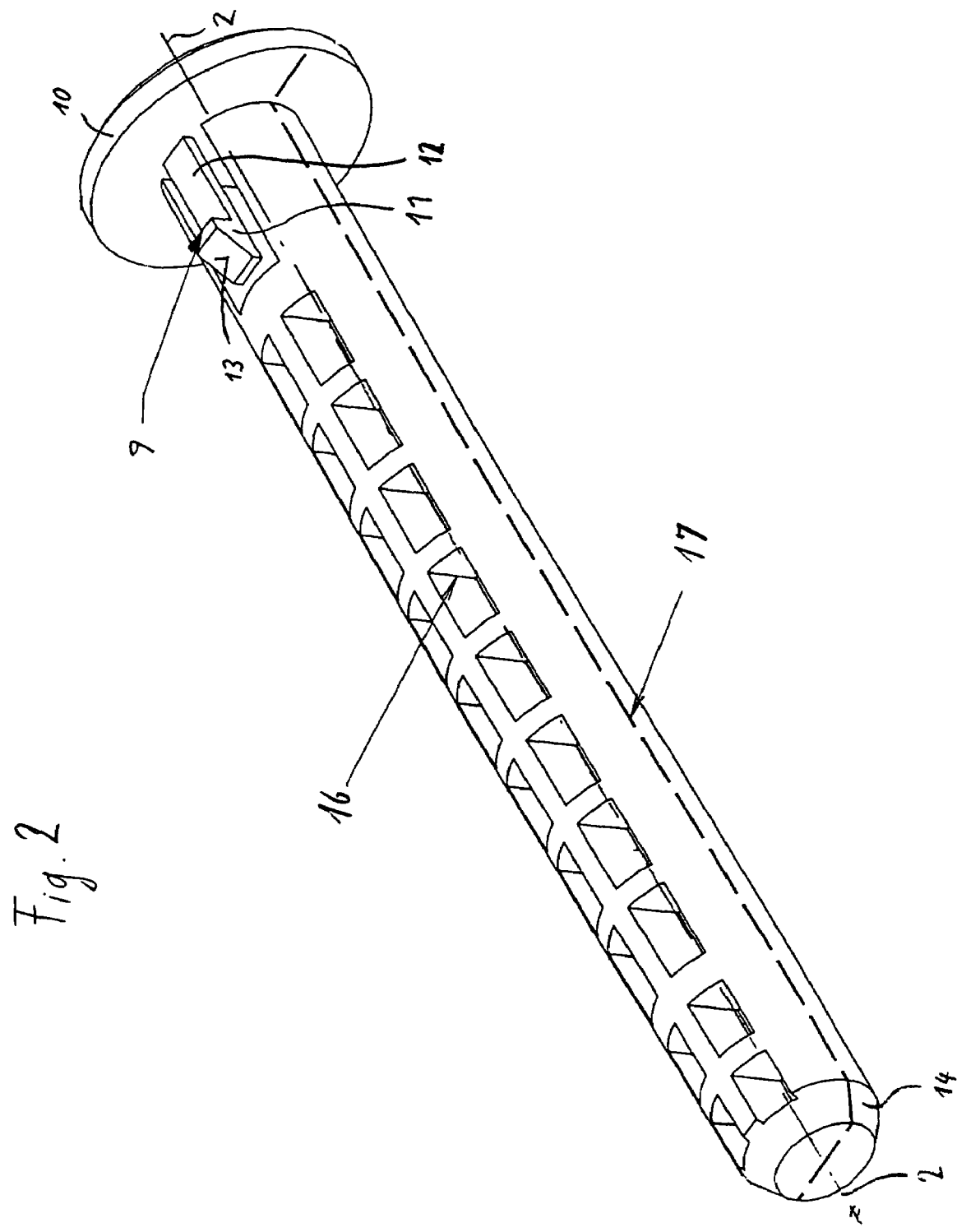

GEAR-CHANGING DEVICE FOR A MOTOR-VEHICLE GEARBOX

BACKGROUND AND SUMMARY OF THE INVENTION

This application claims the priority of Germany, filed May 18, 2001, the disclosure of which is expressly incorporated by reference herein.

The invention relates to a gear-changing device for a motor-vehicle gearbox.

A gear-changing device of this type for a motor-vehicle gearbox is disclosed in German Patent DE 199 18 509 A1. This gear-changing device for a motor-vehicle gearbox includes a gear-changing lever which is arranged so that it can pivot with respect to a support part about a bolt with the bolt being secured in an axially nondisplaceable manner with respect to the support part. For this purpose, the bolt has a bolt head at its one end and at its other end a disc which is secured against axial displacement by a securing ring.

The object of the invention is to provide a cost-effective and easy-to-install gear-changing device.

It is an advantage of the present invention that the bolt bears all of the securing elements necessary for installation.

It is also an object to provide a refined embodiment which provides a significant reduction in material, cost, and weight. In this case, the alignment of the recesses transversely with respect to a longitudinal axis of the bolt enables production as a cast part. In order to produce the latter, liquefied plastic is injected and shaped in two casting half shells whose plane of division runs along the longitudinal axis of the bolt.

Other objects, advantages and novel features of the present invention will become apparent from the following detailed description of the invention when considered in conjunction with the accompanying drawings.

BRIEF DESCRIPTION OF THE DRAWINGS

The invention is described in greater detail below with reference to an embodiment which is illustrated in the drawing, in which FIG. 1 shows a schematized, cut away gear-changing device for a motor-vehicle gearbox, and FIG. 2 shows the bolt of FIG. 1 in a perspective view.

DETAILED DESCRIPTION OF THE PREFERRED EMBODIMENT

FIG. 1 shows, schematically, a gear-changing device which is arranged in the region of a central console of a motor vehicle. In this case, a gear-changing lever 1 is mounted in a manner such that it can pivot about a geometrical longitudinal axis 2 of a bolt 3.

A support body is fastened to the motor-vehicle body 4 and comprises two support arms 5, 6. The two support arms 5, 6 have two mutually aligned receiving holes 7, 8. The bolt 3 is placed through these receiving holes 7, 8. This bolt 3 is held in an axially nondisplaceable manner by means of a catch 9, one end of the bolt 3 being formed as a disc-shaped bolt head 10. The catch 9 includes a wedge 11 which engages behind a region of the support part 5 and is integrally formed on one end of a radially elastically deformable tongue 12. A slope 13 of the wedge 11 and a bevel 14 at the end opposite the bolt head 10 make it possible for the bolt 3 to be introduced in an easy-to-install manner into the receiving holes 7, 8. A recess 15 for receiving the wedge 11 is arranged in the region of the receiving hole 8, which is passed through first in terms of time during the installation. In the fitted state, the end surface of the wedge 11 which lies perpendicular with respect to the longitudinal axis 2 bears against a vertical end surface of the recess 15, the end surface of the wedge 11 facing the bolt head 10.

FIG. 2 shows the bolt of FIG. 1 in a perspective view.

The bolt 3 has recesses 16 which are distributed over its length and are aligned transversely with respect to the longitudinal axis 2. A lattice structure is therefore formed.

The bolt 3 consists of a thermoplastic and is manufactured by injection moulding. For the production of the bolt, thermally liquefied plastic is injected into a two-part casting mould in whose plane of division 17 the longitudinal axis 2 is situated. The casting mould is therefore formed by two casting half shells.

The embodiment described is merely one refinement given by way of example. A combination of the described features for different embodiments is likewise possible. Further features, in particular features which have not been described, of the device parts belonging to the invention can be gathered from the geometries of the device parts illustrated in the drawings.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A gear-changing device for a motor-vehicle gearbox, said device comprising:
   a gear-changing lever pivotably arranged with respect to a support part about a bolt wherein said bolt is held in an axially nondisplaceable manner with respect to the support part; and
   a plurality of recesses which form a lattice structure and which extend transversely with respect to a longitudinal axis of the bolt.

2. The gear-changing device according to claim 1, wherein the bolt consists of plastic.

3. The gear-changing device according to claim 2, wherein the bolt is a component which is cast or injected into at least two casting half shells and the longitudinal axis of the bolt lies in a plan of division of the said half shells.

4. The gear-changing device according to claim 1, wherein the support part comprises two support arms.

* * * * *